Patented May 5, 1953

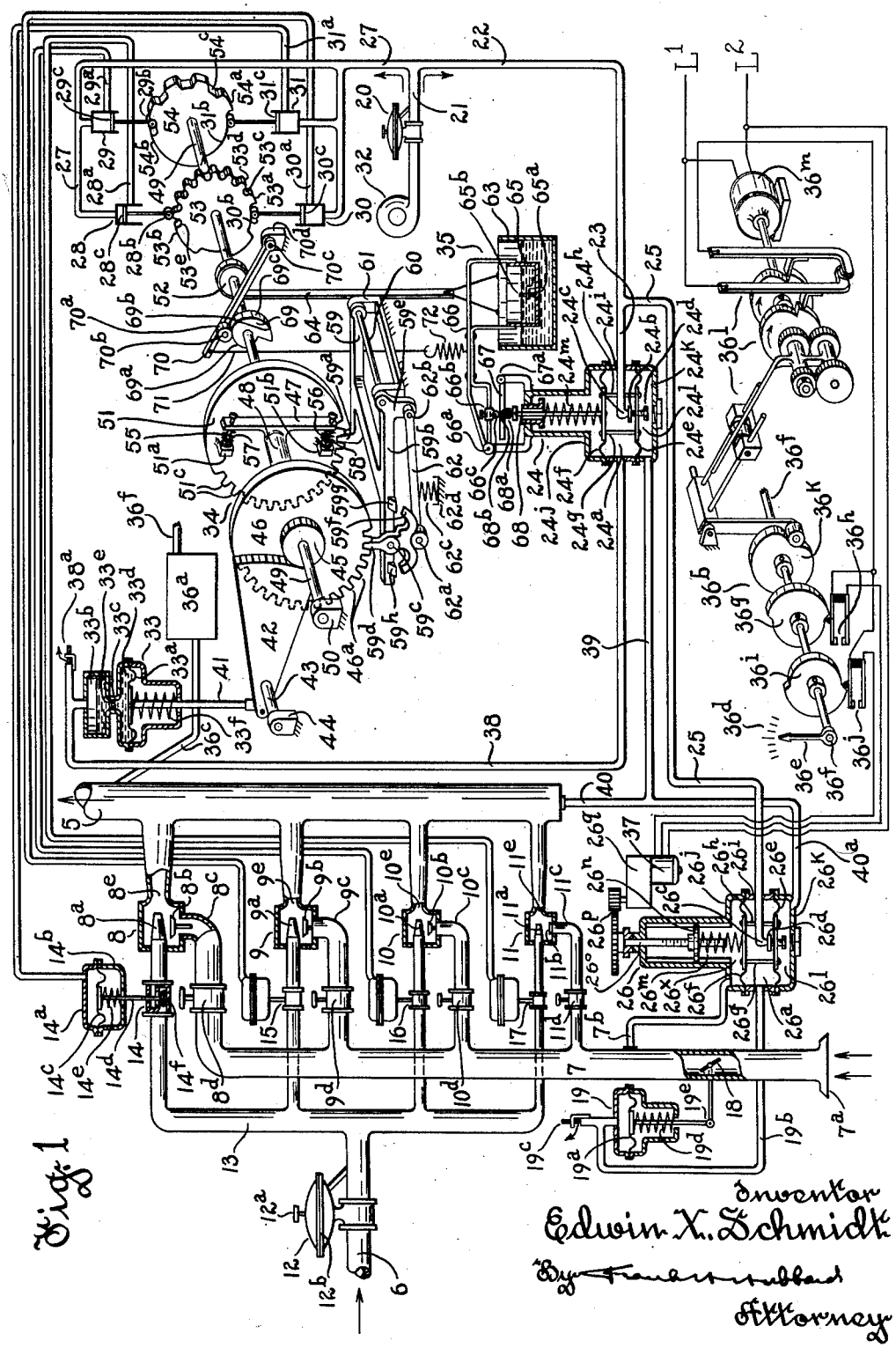

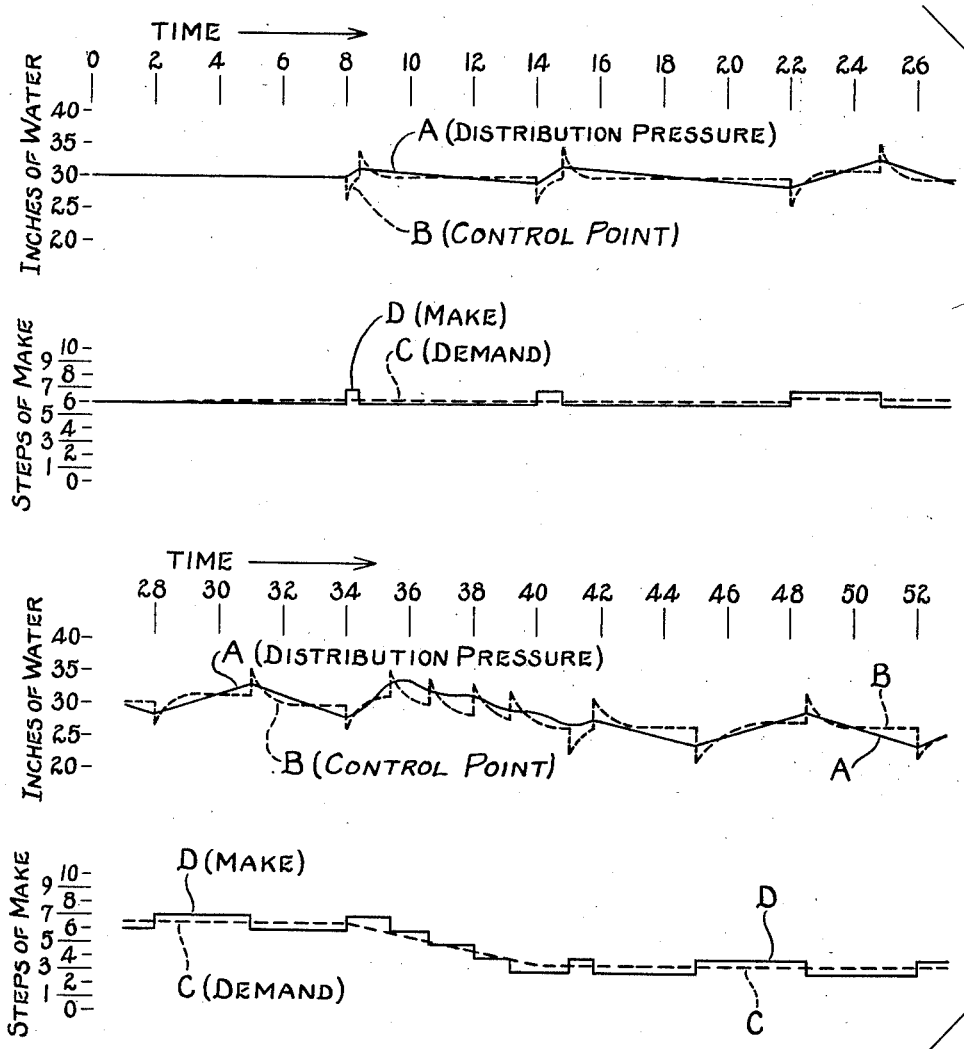

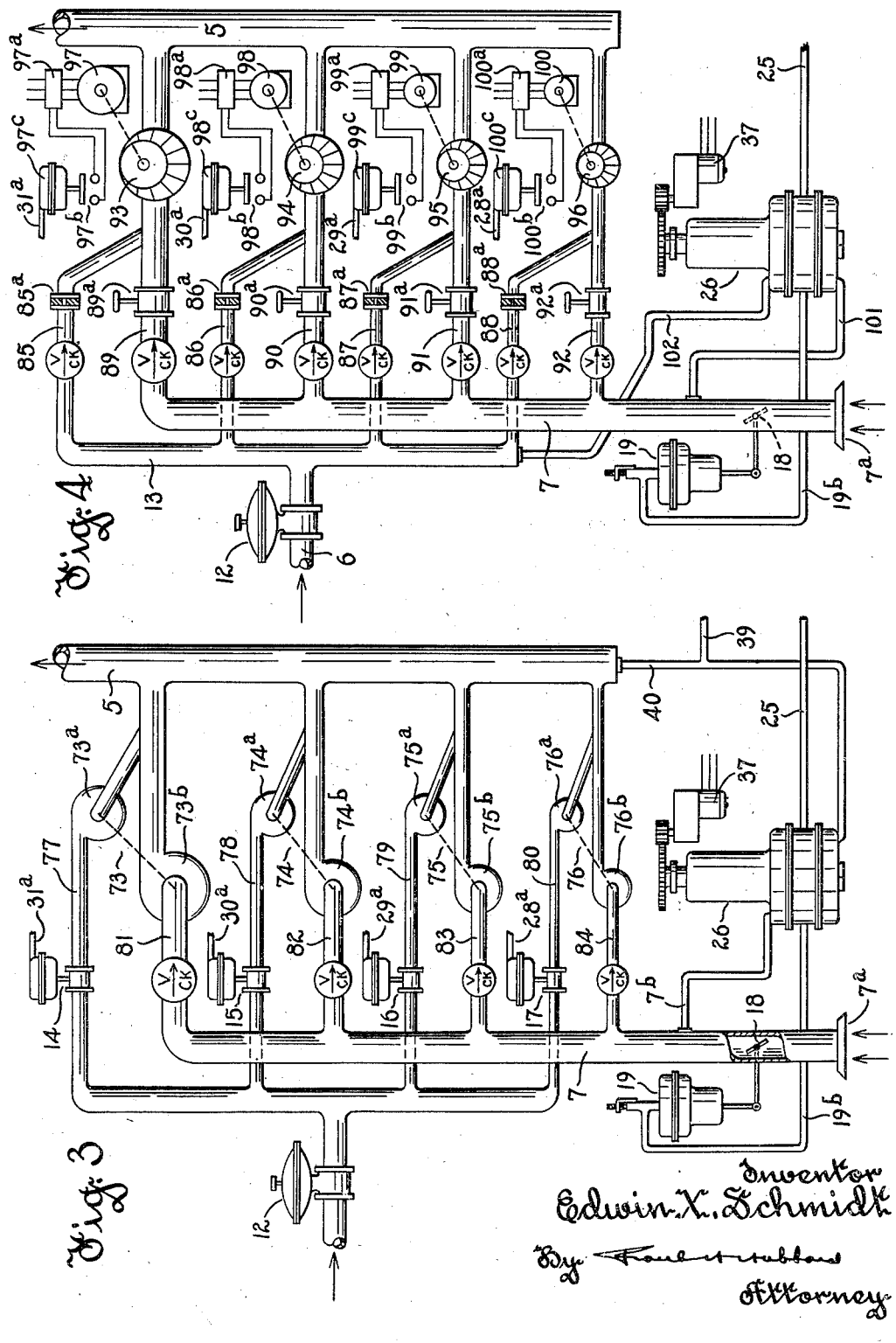

2,637,638

UNITED STATES PATENT OFFICE 2,637,638

METHOD OF AND APPARATUS FOR MIXING COMBUSTIBLE GASES

Edwin X. Schmidt, Milwaukee, Wis., assignor to Cutler-Hammer, Inc., Milwaukee, Wis., a corporation of Delaware Application June 16, 1947, Serial No. 755,030

12 Claims. (Cl. 48—180)

This invention relates to improvements in methods of and apparatus for control of a condition or conditions; and the invention relates more particularly to improved methods of and apparatus for mixing combustible gases.

A primary object of the invention is to provide an improved multiple-rate method of and apparatus for mixing combustible gases.

Another object is to provide a novel method of and means for utilizing a minimum number of gas mixing units to afford a maximum number of different rates of gas mixing.

Another object is to provide a method of and means of the aforementioned character wherein all of the steps of increase or decrease in the rate of gas mixing are equal to each other, whereby improved results of great practical importance are attained.

Another object is to provide for maintenance of a desired distribution pressure regardless of the instantaneous number of units required to be operated to satisfy a given demand for the gaseous mixture.

Another object is to provide a novel method of and means for effecting a preselected increase in the distribution pressure as an incident to an increase in the rate of gas mixing, to thereby compensate for pressure drops in the distribution system associated with a high rate of demand for the mixed gas.

Another and more specific object is to provide for use in a novel manner of a well known form of gas mixing units of the ejector type.

Another object is to provide a novel method of and means for maintaining substantially constant the total heating value per unit volume of the gaseous mixture supplied to the distribution system, regardless of the rate of gas mixing required to meet the demand.

Other objects and advantages of the invention will hereinafter appear.

The accompanying drawings illustrate certain embodiments of my invention which will now be described, it being understood that the invention is susceptible of embodiment in other forms within the scope of the appended claims.

In the drawings,

Figure 1 illustrates schematically and diagrammatically a multiple-unit gas mixing plant constructed in accordance with my invention; the respective units being so related in respect of size as to provide an arithmetic progression in the rate of gas making.

Fig. 2 is a group of curves illustrating the operating characteristics of the gas mixing system shown in Fig. 1, and the manner in which said operating characteristics are controlled under various different conditions.

Fig. 3 illustrates schematically and diagrammatically certain portions of a modified form of gas mixing plant embodying my invention, wherein gas motors of the positive displacement type, driven by the propane vapor under a controlled portion of its own inherent pressure, are adapted to drive air pumps of the positive displacement type respectively associated therewith; said sets of pumps being so proportioned in size as to provide the aforementioned arithmetic progression in the rate of gas mixing for the purpose set forth, and Fig. 4 likewise illustrates schematically and diagrammatically certain portions of another modified form of gas mixing plant embodying my invention, wherein electric motor driven pumps of the positive displacement type, each common to a branch conduit supplying propane and a branch conduit supplying air, are substituted for the jet type compressors shown in Fig. 1; the pumps of Fig. 4 being likewise related, as to the respective sizes thereof, in the manner of a geometric progression.

In my prior Patent No. 1,933,641, granted November 7, 1933, it was proposed to employ multiple gas mixing units one or more of which could be either operated at full capacity or shut off, as a function of variations in distribution pressure. In a gas mixing plant of the character disclosed in said Patent No. 1,933,641 a decrease to a preselected value of distribution pressure effected initiation of operation of a small gas mixing unit which continued to operate alone until the distribution pressure arose to some preselected value which would effect interruption of operation thereof. However, if the distribution pressure should fall to a preselected value, somewhat lower than that at which the first unit was cut in, operation of a second, and additional, gas mixing unit would be initiated. A further drop in the distribution pressure might cut in another additional unit, and the respective units would ordinarily be arranged to be cut out of operation in the reverse order with respect to that in which they were cut in; and as a consequence the distribution pressure would always be lower when the gas mixing rate was highest.

The objection to such a system is obvious, inasmuch as in gas distribution it is desirable to carry a higher pressure as the load or demand increases, to compensate for pressure drops in the system associated with a high rate of demand for the gas. Another serious objection to a system like that just mentioned is due to the fact that inasmuch as the rate of rise or fall of pressure in a distribution system depends upon the net rate of flow into or out of the distribution system and the capacity of the latter, periods of either off or on with the larger gas mixing units are objectionably short, with resultant instability of plant operation.

In accordance with my present invention a multiplicity of gas mixing units of different sizes are employed, the sizes of the various units being so related to each other that each step of increase or decrease in the gas mixing schedule is the same, and therefore is an equal proportion of the total gas mixing capacity of the whole plant. As a consequence, with a continuing demand for the combustible gaseous mixture, the maximum rate of rise or fall in distribution pressure is substantially uniform regardless of the number of gas mixing units required to be in operation at any given time. With such an arrangement I am enabled to use effective anti-hunting means to prevent unnecessary, or undesirable, cutting in and cutting out of gas mixing units. Also in accordance with my invention the plant operates in such a manner that the distribution pressure increases in accordance with the required rate of increase in gas mixing. Other novel and important functional characteristics of my improved method of and apparatus for gas mixing will become apparent in the course of the following description.

In Fig. 1 the numeral 5 designates a discharge manifold or conduit of relatively large cross section supplying a combustible mixture of gases to a distribution system (not shown), with conduits 6 and 7 arranged to supply two different gases to gas mixing units 8, 9, 10 and 11, for delivering a mixture of the two gases into conduit 5. In practice I prefer to supply through conduit 6, at some suitable pressure (either the total self-generated pressure or a major portion thereof), the vapor of a volatile hydrocarbon liquid, as, for instance, propane vapor. A regulator 12 of well known form is associated with conduit 6 in a manner to maintain the pressure in the vapor manifold 13, and consequently at the inlet ends of the respective shutoff valves 14, 15, 16 and 17, at a fixed value, which may be preselected by manual adjustment of knob 12$^a$ to vary the degree of spring loading of the diaphragm of regulator 12, indicated somewhat diagrammatically at 12$^b$.

Valves 14 to 17 are normally closed by springs individual thereto, and go wide open when a preselected degree of fluid pressure is applied at the upper surfaces of their respective diaphragms. The operating means for the valve 14 is shown enlarged and in section, and diagrammatically, as comprising upper and lower fixed housing portions 14$^a$ and 14$^b$, with a diaphragm 14$^c$ interposed therebetween; a valve rod 14$^d$ being suitably attached to diaphragm 14$^c$, and a coiled spring 14$^e$ being interposed between the bottom wall of housing portion 14$^b$ and diaphragm 14$^c$ to normally bias the valve disk 14$^f$ against its seat to close the valve; said parts being shown, however, in valve-opening position. It is to be understood that the operating elements of valves 15, 16 and 17 may be of substantially the same size as the corresponding elements of valve 14, with the exception that the valve disks and their seats are preferably of sizes proportional to the sizes of the branch conduits in which they are respectively located.

The gas mixing units 8 to 11, inclusive, are preferably of the conventional ejector or jet compressor type, as shown; the same merely differing in size or dimensions in the relationship of a geometric progression, as hereinafter described. The gas which flows through conduit 7 preferably consists of atmospheric air; and the enlarged inlet end 7$^a$ of conduit 7 may include a screen or other suitable form of filtering means (not shown).

The branch streams of propane vapor flow through the jets 8$^a$, 9$^a$, 10$^a$ and 11$^a$ of the respective units, which are provided with check valves 8$^b$, 9$^b$, 10$^b$ and 11$^b$ in the branch conduits 8$^c$, 9$^c$, 10$^c$ and 11$^c$ through which the induced air is supplied. The discharge of each ejector unit enters the discharge manifold 5 and thence passes to the distribution system. The induced air duct 8$^c$, 9$^c$, etc. of each ejector unit includes a manually adjustable throttling valve 8$^d$, 9$^d$, 10$^d$ and 11$^d$, respectively. Air enters the induced air conduit or duct 7 through a throttling valve 18.

The gas mixing units 8 to 11, inclusive, are preferably of like construction, but differ in their respective sizes, as aforementioned; the sizes thereof being so selected that each unit has twice the capacity of the next smaller unit. Thus, in a four-unit plant like that illustrated in Fig. 1, with the smallest unit 11 of predetermined capacity, the next larger unit 10 will have twice that capacity; the next larger unit 9 will have four times the capacity of unit 11, and the largest unit 8 will have eight times the capacity of unit 11. Accordingly the units 8 to 11, inclusive, when active individually or jointly in various combinations, are adapted to provide fifteen equal steps of increase or decrease in the rate of supply of the combustible gaseous mixture; each step corresponding to 6⅔ per cent of the total capacity of the entire plant. The aforementioned throttling valve 18, which may be of the butterfly type, in the air intake manifold 7 is operable automatically by a diaphragm motor 19, in the manner hereinafter described, to maintain substantially constant the difference between the values of the pressures within the air intake manifold 7 and the aforementioned discharge manifold 5.

From the foregoing it will be apparent that the number of gas mixing units might be increased from four to five, and again sized in geometric progression; in which case thirty-one rates of gas making would be obtained, each increment in flow corresponding to 3.225 per cent of the total capacity of the entire plant.

An adjustable regulator 20 of well known form is adapted to control the pressure of compressed air supplied to conduit 21, one branch 22 of which communicates, through conduit 23 under given conditions, with the interior of pilot regulator 24, and, through conduit 25 under given conditions, with the interior of pilot regulator 26. The other branch 27 of conduit 21 is adapted to communicate as shown with the four valve mechanisms 28, 29, 30 and 31. In practice I prefer to maintain the compressed air pressure in conduit 21 and the parts associated therewith at approximately twenty-five pounds per square inch. An air compressor is shown diagrammatically at 32.

The housings of valves 28, 29, 30 and 31 communicate, through conduits 28$^a$, 29$^a$, 30$^a$ and 31$^a$, with the diaphragm motors associated with the aforementioned valves 17, 16, 15 and 14, respectively, to effect opening of one or more of the latter under predetermined conditions, against the normal spring bias thereof to closed position; the biasing spring of valve 14 being shown at 14e, as aforestated.

Pilot regulator 24 is adapted for operation in a manner to control the action of a diaphragm motor 33 to effect step by step actuation of the rate scheduling mechanism designated in general by the numeral 34, with consequent control of the aforementioned valves 28 to 31, inclusive.

The hydraulic stabilizing means, designated in general by numeral 35, is adapted to modify the operation of pilot regulator 24 in a manner to prevent undesirable adjustments of the scheduling mechanism 34 and to prevent hunting.

Calorimetric control means (parts of which are shown at 36a and other parts of which are shown at 36b) are adapted to control the degree of spring loading on pilot regulator 26, through the medium of a reversible motor 37; the latter being operable automatically in the manner hereinafter described to maintain substantially constant the total heating value per unit volume of the gaseous mixture supplied to discharge manifold 5.

Operation of the gas mixing control system illustrated in Fig. 1 is as follows: Assuming that the system is in operation producing a combustible gaseous mixture of the desired total heating value per unit volume at a volumetric rate which exactly corresponds with the demand for said mixture from the distribution system, and further assuming that the air pressure in conduit 38 (which affords communication between pilot regulator 24 and diaphragm motor 33) is at the desired value predetermined by the setting of pilot regulator 24. Under these conditions the net flow into the distribution system is zero and the distribution pressure will, of course, remain constant.

In the event of an increase in demand for the gaseous mixture corresponding to 3 per cent of the maximum capacity of the plant, the net flow into the distribution system would be minus 3 per cent, and the distribution pressure would decrease at a rate depending upon the capacity of the distribution system and the maximum capacity of the plant. Said decrease in distribution pressure causes pilot regulator 24 to increase the degree of loading of diaphragm motor 33; which change in loading tends to and finally does (if unbalance of pilot regulator 24 continues long enough) cause a step in the operation of mechanism 34 in a direction to initiate operation of one of the gas mixing units (8 to 11) and to discontinue operation of one or more of the other of said units (if necessary), to thereby produce an increase in the rate of gas mixing corresponding to 6⅔ per cent of full plant capacity. Said increase in loading of diaphragm motor 33 also reacts through the medium of hydraulic stabilizer 35 to at least temporarily effect a decrease in the degree of loading of pilot regulator 24.

Hydraulic stabilizer 35 is preferably arranged or adjusted in a manner to exert a force on pilot regulator 24 of sufficient value to temporarily actually reverse the direction of movement of diaphragm motor 33 to a slight degree, under the conditions just mentioned. The controlling effect of stabilizer 35 gradually disappears during the time when the distribution pressure builds up, due to the resultant flow into the distribution system of 3⅔ per cent of the total plant capacity; that is to say, the difference between the increase in the rate of gas mixing (6⅔ per cent) and the minus 3 per cent of net flow incident to the increase of demand of 3 per cent of the total plant capacity. Pilot regulator 24 therefore causes no appreciable movement of diaphragm motor 33 until the net flow gradually builds up the distribution pressure to a value predetermined by the initial degree of loading of regulator 24 unaffected by the action of hydraulic stabilizer 35.

Inasmuch as the position of the diaphragm 33a of diaphragm motor 33 is substantially directly related to the pressure maintained by pilot regulator 24, it is of course possible to increase the degree of pressure of fluid (from regulator 24) upon the body of liquid in chamber 33b, as an incident to each given increase in the rate of gas mixing, while still preventing excessive hunting, by increasing the auxiliary loading effect produced by the hydraulic stabilizer 35. The means for and manner of attaining this result will be described in detail hereinafter.

It is to be understood that under certain conditions the rate of demand for gas may vary rapidly, so that the action of hydraulic stabilizer 35 may not have been dissipated by the time another step (increase or decrease) in the rate of gas making becomes necessary. Therefore two, or even three, steps may be taken in quite rapid succession. The stabilizer 35 is therefore so constructed and arranged that the effect thereof is limited to the equivalent of several steps, so that maximum temporary deviation from the desired control point cannot exceed a predetermined value.

If cup 65 is depressed about two steps the rise in liquid level outside of the cup is enough to make the liquid spill over the top thereof. If cup 65 is raised about two steps the fall in liquid level outside of the cup is enough to fall below the bottom of cup 65; so that farther lifting of the cup causes no change in the degree of loading of regulator 24. It is obvious that upon high rates of demand from the distribution system, when the bucket 63 is high, more lifting and less depressing of the cup 65 than the aforementioned two steps would be required for the release to occur.

The aforementioned calorimetric device, although shown more or less diagrammatically at 36a, 36b, is to be understood as including well known structural features and operative characteristics of each of the following patents, to which reference may be had for a more complete understanding of said device, namely; No. 1,625,277, granted April 19, 1927, to Horace N. Packard, No. 2,002,279, granted May 21, 1935, to Edwin X. Schmidt; No. 2,415,913, granted February 18, 1947, to Edwin X. Schmidt; No. 965,824, granted July 26, 1910, to Morris E. Leeds, and No. 1,125,699, granted January 19, 1915, to Morris E. Leeds.

Thus the portion 36a includes means for withdrawing, through conduit 36c, from distribution manifold 5, a continuous sample of the gaseous mixture, the total heating value per unit volume of which is continuously ascertained, and indicated at scale 36d by a pointer 36e fixed to the shaft 36f. A cam member 36g attached to shaft 36f is operable to effect closure of the "high" direction contacts 36h, and a cam member 36i also attached to shaft 36f is operable to effect closure of the "low" direction contacts 36j. Also attached to shaft 36f is a cam member 36k which cooperates with the various elements designated in general by the numeral 36l for regulating the "part time on" during which the heating value adjusting motor 37 may be operated in one direction or the other to adjust the degree of loading of the pilot regulator 26. The elements 33¹ as shown include an electric motor 36ᵐ connected with supply lines L¹, L², for continuous operation thereof unidirectionally. The specified means for controlling operation of motor 37 are substantially like those shown and described in my prior Patent No. 2,415,913 aforementioned, to which reference may be had. As aforestated the pilot regulator 26 is primarily responsive to variations in the pressure difference between the suction manifold 7 for the air and the pressure within discharge manifold 5 for the gaseous mixture.

The pilot regulator 26 includes an assembly comprising a pair of diaphragms 26ᵉ and 26ᶠ, the central portions of which are backed by rigid metal plates, and the plates and diaphragms are attached in spaced relationship by a suitable number of rods or studs, two of which are shown at 26ᵍ and 26ʰ. The periphery of diaphragm 26ᵉ is clamped between a lower housing member 26ᵏ and an intermediate housing member or ring 26ⁱ, a lower chamber 26ˡ being provided thereby. The periphery of diaphragm 26ᶠ is clamped between ring 26ⁱ and the upper housing member 26ʲ; thus providing an intermediate chamber 26ᵃ and an upper chamber 26ˣ. The aforementioned conduit 25 extends through ring 26ⁱ in pressure-tight relationship and terminates in a nozzle 26ᶜ with which an adjustable seat member 26ᵈ is adapted to cooperate to effect closure or opening of the nozzle or to permit a variable rate of flow of compressed air through the latter. Conduits 40 and 40ᵃ afford communication between the aforementioned discharge manifold 5 and chamber 26ˡ, to subject diaphragm 26ᵉ to the pressure of the gaseous mixture in manifold 5.

A conduit 7ᵇ affords communication between the air conduit 7 and the aforementioned chamber 26ˣ, whereby the diaphragm 26ᶠ is subjected to the degree of pressure (or partial vacuum) existing in conduit 7. Diaphragm 26ᶠ is normally subjected to the pressure of a coiled compression spring 26ᵐ; the degree of compression of said spring being adjustable by an abutment 26ⁿ in the form of a traveling nut, whose position is varied upon rotation of a threaded shaft 26ᵒ in one direction or the other. Shaft 26ᵒ is adapted to be driven, through gearing 26ᵖ and suitable speed-reducing gearing 26ᑫ, by a split-field reversible motor 37, which is subject to control by the aforementioned means 36ᵇ operable by the calorimeter 36ᵃ.

The upper surface of diaphragm 19ᵃ of diaphragm motor 19 is subjected to the pressure of fluid within chamber 26ᵃ through the medium of a conduit 19ᵇ; said pressure being adjustably vented to atmosphere by the means shown at 19ᶜ. Diaphragm 19ᵃ is loaded for normal movement thereof in an upward direction (to effect full opening of valve 18) by a spring 19ᵈ; suitable leverage 19ᵉ being interposed between diaphragm 19ᵃ and valve 18 for this purpose. By the means aforedescribed a preselected normal differential value of the pressure conditions in conduits 5 and 7 is insured, thus insuring maintenance of proportionality of the flows of hydrocarbon vapor and air in the active gas making units. For the purpose of providing the desired proportionality, initial manual adjustment of valves 8ᵈ to 11ᵈ, inclusive, is involved. That is to say, valves 8ᵈ to 11ᵈ, inclusive, are adjusted to compensate for any minor variations in the inherent proportioning characteristics of the respective gas mixing units with respect to each other. The last mentioned normal differential value is automatically varied in accordance with the operation of calorimeter 36ᵃ to insure maintenance of a predetermined constant total heating value per unit volume of the gaseous mixture supplied to the distribution system through manifold 5.

The operation of the step by step mechanism 34 is as follows: The rate of flow of compressed air through conduits 22 and 23 into chamber 24ᵃ of pilot regulator 24 is controlled by movement of valve seat 24ᵇ relatively to valve nozzle 24ᶜ. Valve seat 24ᵇ is adjustably mounted, as by means of bolt 24ᵈ, upon the lower diaphragm 24ᵉ of the assembly including the upper diaphragm 24ᶠ; the diaphragms 24ᵉ and 24ᶠ being rigidly attached to each other in spaced relationship by a multiplicity of posts, two of which are shown at 24ᵍ and 24ʰ. The peripheries of the diaphragms 24ᵉ and 24ᶠ are clamped between the ring 24ⁱ and the top and bottom housing members 24ʲ and 24ᵏ; thus forming the aforementioned chamber 24ᵃ between diaphragms 24ᵉ and 24ᶠ, and the chamber 24ˡ between the lower diaphragm 24ᵉ and housing member 24ᵏ. Conduits 40 and 39 afford communication between discharge manifold 5 and chamber 24ˡ, so that the lower face of diaphragm 24ᵉ is subjected to the degree of pressure existing in the distribution system.

The effective areas of diaphragms 24ᵉ and 24ᶠ are substantially equal when the diaphragm assembly (24ᵉ, 24ᶠ, 24ᵍ, 24ʰ) is in the normal operating position, which is determined by the position of valve seat 24ᵇ with respect to said diaphragm assembly and the distance which must separate the valve nozzle 24ᶜ from valve seat 24ᵇ to satisfy the normal rate of flow out of chamber 24ᵃ. The distance just mentioned varies only to a very slight degree as an incident to variations in the degree of pressure in chamber 24ᵃ and such variations in distance do not appreciably affect the effective areas of diaphragms 24ᵉ and 24ᶠ, and therefore the forces exerted by the variable pressure on these diaphragms remain substantially equal and opposite, provided that normal operating positions are properly adjusted. Valve seat 24ᵇ is adjustably mounted in the diaphragm assembly, so that by raising or lowering the valve seat in the diaphragm assembly the normal operating position of the diaphragm assembly is either lowered or raised, changing the relative effective areas of the diaphragms. Raising the diaphragm assembly makes the relative effective area of the top diaphragm 24ᶠ larger than that of the lower diaphragm 24ᵉ, so that an increase in loading pressure in chamber 24ᵃ, associated with increase in rate of gas mixing, exerts an upward force on the diaphragm assembly, and thus reduces the loading on the regulator 24. Thus by lowering valve seat 24ᵇ in the diaphragm assembly the control point of regulator 24 can be made to become lower as a function of the pressure in chamber 24ᵃ, or regulator 24 can be made to depart from full floating type of control and give proportional control in which the controlled pressure is reduced as the maintained pressure in chamber 24ᵃ is increased. The stability of control inherent in proportional mode of control provided by this characteristic may in some instances be desirable, particularly in instances where exceedingly long time lags are involved in the system. Under any condition the departure from the control point corresponding to a single step of make will be small so that the control point of regulator 24 is substantially unaffected by the loading pressure in chamber 24$^a$.

Pilot air from chamber 24$^a$ passes through conduit 38 to the chamber 33$^b$ forming an oil pot, said chamber 33$^b$ being adjustably vented to a low pressure point, such as the atmosphere, through an adjustable orifice 38$^a$. A reduced portion or conduit 33$^c$ is positioned between chamber 33$^b$ and the upper chamber 33$^d$ of the diaphragm motor 33; said reduced portion having therein an orifice 33$^e$ which affords communication between said chambers 33$^b$ and 33$^d$. Diaphragm 33$^a$ of motor 33 is biased upwardly by a coiled compression spring 33$^f$. Chambers 33$^d$ and 33$^b$ contain a sufficient quantity of a suitable liquid, such as mineral oil, to insure the presence of some of the oil in chamber 33$^b$ even though diaphragm 33$^a$ is in its downward extreme position; and the chamber 33$^b$ is of a sufficiently large size to insure that oil will not be forced into conduit 38 when diaphragm 33$^a$ is in its upper extreme position.

As the rate of flow of pilot air into chamber 24$^a$ is permitted to increase the net flow into conduit 38 and chamber 33$^b$ increases, thus increasing the degree of air pressure. The increase in air pressure tends to slightly increase the degree of loading of pilot regulator 24, increases the rate of flow through the orifice or bleeder 38$^a$, and causes oil to flow from chamber 33$^b$ through orifice 33$^e$ into chamber 33$^d$, against the bias of spring 33$^f$ at the lower face of diaphragm 33$^a$. As a result the connecting rod 41 is moved downwardly, thereby effecting movement of gear segment 42 in a counterclockwise direction about its pivot 43, which is carried by a fixed support 44. Segment 42 is continuously engaged with gear 45, which is formed integrally with or otherwise rigidly attached to both the latch gear 46 and the drive arm 47 (through the medium of hub member 48); the assembly of gears 45 and 46, hub 48 and arm 47 being free to rotate relatively to shaft 49 under the conditions hereinafter described.

Shaft 49 is freely rotatable in fixed bearings at opposite ends thereof; one of said bearings being shown at 50. Mounted upon and rigidly attached to shaft 49 for rotation therewith are step gear 51, pulley or winding wheel 52, and cam members 53 and 54. Step gear 51 has formed integrally therewith or otherwise rigidly attached thereto a pair of abutments 51$^a$ and 51$^b$ against which one head portion of each of a pair of studs 55 and 56 (held captive adjacent opposite ends of arm 47) are respectively adapted to abut under the bias afforded by the coiled compression springs 57 and 58, respectively. The arrangement is such that clockwise movement of drive arm 47 about shaft 49 and with respect to step gear 51 will compress spring 58, thus causing stud 56 to exert, through abutment 51$^b$, a clockwise torque upon step gear 51. Stud 55 is simultaneously moved away from abutment 51$^a$. A similar effect, in the reverse direction, is produced by a counterclockwise movement of drive arm 47.

Step latch 59$^a$ forming part of a compound lever 59, pivotally mounted upon a pin or rod 60 carried by a fixed bracket 61, is arranged to engage between a pair of the multiple teeth 51$^c$ of step gear 51 to lock the latter against rotation. The arm 59$^b$ of lever 59 has pivoted thereto at 59$^c$ an actuating latch 59$^d$ which is normally biased to an intermediate position (as shown) by a roller 62$^a$ which is rotatably supported at one end of a lever 62, whose other end is pivotally supported at 62$^b$ to a downward extension 59$^e$ of said arm 59$^b$. The upward bias of roller 62$^a$ is afforded by a suitable coiled compression spring 62$^c$ interposed between the lower edge of lever 62 and a fixed abutment 62$^d$.

Actuating latch 59$^d$ is arranged to engage between any adjacent pair of the multiple teeth 46$^a$ formed peripherally upon latch gear 46, in such a manner that clockwise rotation of gear 46 rotates latch 59$^d$ in a counterclockwise direction about pivot 59$^c$ until the right-hand lug 59$^f$ of latch 59$^d$ engages an abutment 59$^g$ carried by arm 59$^b$ aforementioned, thereby preventing further counterclockwise rotation of latch 59$^d$ with respect to arm 59$^b$. Continued clockwise rotation of gear 46 will then force lever 59 to move in a counterclockwise direction about rod 60, thereby causing movement of latch 59$^a$ out of engagement with step gear 51. The shape of the teeth in step gear 51 and latch 59$^a$ are such that after latch 59$^a$ has been moved partly out of the notch between a pair of teeth, the torque exerted by spring 58 will be sufficient to act upon lever 59 to compress spring 62$^c$ to the required degree to permit latch 59$^a$ to clear the outer end of the particular cooperating tooth of step gear 51, and to also permit latch 59$^d$ to clear the outer end of the particular cooperating tooth of latch gear 46; with consequent return of latch 59$^d$ to its aforementioned intermediate position; the same dropping into the next adjacent notch between a pair of the teeth on gear 46.

It is to be understood that when step gear 51 is released the load exerted on stud 56, through spring 58, is likewise released. Such unloading tends to make rod 41 of diaphragm motor 33 move an additional amount. Inasmuch as some time is required for lever 59 to drop latches 59$^d$ and 59$^a$ into the respective gears 56 and 51, orifice 33$^e$ and the aforementioned body of oil are provided. The sudden change in the degree of loading upon the lower face of diaphragm 33$^a$ would result in substantially instantaneous movement of said diaphragm, except for the fact that any movement of diaphragm 33$^a$ immediately results in the establishment of a pressure drop of high value through orifice 33$^e$, thus reducing the pressure upon the upper surface of diaphragm 33$^a$ and insuring a rate of movement sufficiently slow to provide ample time for the latches 59$^a$ and 59$^d$ to fall into place. Orifice 33$^e$ will also affect the normal rate of movement of rod 41 as a function of change in pressure in conduit 38; but such change in pressure occurs very slowly, and the effect of a suitable orifice for preventing overtravel is substantially nil under these conditions.

Movement of step gear 51 through one step in the manner just described results in rotary movement of wheel 52 and cams 53 and 54 through a corresponding angle, with consequent operation of one or more of the valve mechanisms 28 to 31, inclusive, in a manner to effect application of pressure to, or release of pressure from, the upper surfaces of certain of the operating diaphragms of valves 14 to 17, inclusive (see diaphragm 14$^c$); which valves are normally spring-biased to their respective closed positions. With cams 53 and 54 in the positions thereof shown in Fig. 1, gas mixing units 8, 9 and 10 are in operation (step number 14). One farther step of clockwise movement of gear 46 would result in a corresponding degree of angular movement of cams 53 and 54, whereby units 8, 9 and 10 would be maintained in operation and valve mechanism 28 would be permitted by cam 53 to operate to bring in the gas mixing unit 11, thus providing for full capacity operation of the entire plant.

Said last mentioned step of gear 46 in a clockwise direction would also effect a proportional degree of lifting of a bucket 63, which is suspended by a belt or tape 64 attached to wheel 52. Bucket 63 is partially filled to a predetermined level with a suitable liquid, such as mineral oil. A cup 65 is so positioned within bucket 63 that the normal level of the liquid will be between the bottom wall and the upper edge of the cup in any operative position of bucket 63. As shown, cup 65 is rigidly attached to a lever 66, which is pivoted at 66$^a$ to an extension of the pilot regulator 24. A slider 66$^b$ is mounted to slide upon a part of lever 66; said slider preferably including a roller 66$^c$, which is continuously engaged with a counter-lever 67, which is pivoted at 67$^a$ to another extension of pilot regulator 24.

A rod 68, which is preferably adjustable in length (as by means of the threadedly connected elements 68$^a$ and 68$^b$), is interposed between counter-lever 67 and the upper surface of the backing-plate of diaphragm 24$^f$. Rod 68 is so adjusted in length that with the diaphragm assembly in its normal position counter-lever 67 and the portion of lever 66 carrying slider 66$^b$ will be substantially parallel to each other, whereby slider 66$^b$ may be moved toward or farther away from pivot 66$^a$, to change the degree of amplification of the force exerted by cup 65 upon rod 68 without any required change in the relative position of cup 65.

Cup 65 and lever 66 normally tend to jointly exert a clockwise torque, with a resultant downward force upon the aforementioned assembly of diaphragms 24$^f$ and 24$^e$, which is additional to the manually adjusted force produced by spring 24$^m$. A step of movement of wheel 52 in the clockwise direction raises bucket 63 and (through the medium of the liquid in the latter) tends to lift cup 65, thus reducing the degree of force exerted by rod 68 upon the diaphragm assembly 24$^e$, 24$^f$, 24$^g$, 24$^h$. Such movement of bucket 63 raises the level of liquid in the annular space between bucket 63 and cup 65. The temporarily increased displacement of the liquid in bucket 63 by cup 65 determines the degree of reduction in the loading of pilot regulator 24.

Cup 65 is provided with an orifice or opening 65$^a$ which provides for gradual equalization of the level of the liquid inside of cup 65 with respect to that outside thereof. Suitable means is preferably provided for adjusting the size of orifice 65$^a$ so that the rate of decrease in auxiliary loading of regulator 24, as an incident to a step movement, may be readily adjusted in accordance with conditions in a given installation, in respect of capacity of the distribution system, increment in flow for each increase in the rate of gas mixing, and provision of the desired distribution pressure. In Fig. 1 I have shown, by way of example, and adjustable screw 65$^b$ for varying the size of orifice 65$^a$.

Similarly, in the event of a step of movement of wheel 52 in a counterclockwise direction, the displacement of liquid by the cup 65, is decreased, thus increasing the degree of force applied by rod 68 to diaphragm assembly 24$^e$, etc., the orifice 65$^a$ acting as aforedescribed to effect gradual equalization of the level of the liquid inside of cup 65 with respect to that outside thereof, as aforedescribed.

With respect to the effect of net flow (that is to say, the rate of gas mixing minus the rate of demand for the combustible gaseous mixture from the distribution system) upon the degree of pressure of the gas in the distribution system, I have hereinabove pointed out that the distribution pressure should preferably be increased at a rate substantially proportional to the increase in the rate of demand, thus providing for proper determination of the most desirable rate of gas mixing.

With fifteen steps or variations of equal value in the rate of gas mixing, as provided by the fifteen-step mechanism hereinabove described, each step of increase or decrease in the rate of gas mixing represents a change in the rate of gas mixing corresponding to six and two-thirds per cent of the total capacity of the plant. It is therefore possible to set the rate of gas mixing within six and two-thirds per cent of the instantaneous rate of demand, so that the rate of rise or fall of pressure in the distribution system can be maintained between zero and a rate depending upon the relationship between the volumetric capacity of the distribution system and the total plant capacity.

For example, with a distribution system having a volumetric capacity equal to one-half of the maximum hourly capacity of the plant, the change in rate of gas mixing corresponding to six and two-thirds per cent of the maximum rate of gas mixing would be 13.3 per cent of the capacity of the distribution system per hour. In one hour the distribution pressure would therefore change 13.3 per cent of one atmosphere, or at a rate of: (.133)(408), divided by 60, inches of water per minute; or, in general, with a distribution system having a volume in cubic feet equal to $V_d$ times the maximum hourly capacity of the plant in cubic feet per hour, the maximum rate of net flow of 6⅔ per cent of maximum capacity will cause a change in pressure at a rate of $0.453/V_d$ inches of water column per minute. The minimum rate of change would, of course, be zero, and in normal operation of the system the rate of change would vary between zero and the above-mentioned maximum determined by the value of $V_d$, which as will be understood may be determined by dividing the volumetric capacity of the distribution system by the maximum volumetric capacity of the plant per hour. The minimum rate of pressure change could, of course, be zero if the net flow were zero, but it is to be understood that in general the rate of gas mixing will seldom correspond exactly with the rate of demand. Therefore the pressure will usually be changing in one direction or the other.

It may also be noted that if the demand is steady at one per cent of total plant capacity above one particular step of gas mixing, the plant will (in order to average a constant pressure) operate on this step (six and two-thirds per cent minus one per cent divided by six and two-thirds per cent) or eighty-five per cent of the time, and fifteen per cent of the time on the next higher step. With the demand half-way between two steps or rates of gas mixing the period of operation on each step above and below the desired value should be the same in order to maintain a constant average pressure.

The customary method of control of a multi-unit system of this general type utilizes a mode of control known as proportional-position-action control in which there is a continuous linear relationship between value of pressure and the rate of gas mixing. More specifically, for each successive decrease in pressure there is a definitely related increase in rate of gas mixing. Such a system inherently tends to be stable, but it also inherently tends to maintain a lower pressure as the rate of gas mixing increases. When associated with a step-by-step action such usual method also includes the additional disadvantage that the running time on any particular step is decreased.

Maintenance of a lower pressure as an incident to each increase in the rate of gas mixing is definitely objectionable in a distribution system, because the increased pressure drop from the gas mixing plant to the various different points of consumption (as an incident to the increased rate of demand) makes it very desirable to maintain a higher pressure at the plant as the demand increases. Such a system would, in general, be unstable and cause hunting; and an important phase of the present invention resides in the novel method of and means for preventing instability and excessive changing of the rates of gas mixing.

One suitable means for insuring the desired degree of increase in the distribution pressure (as represented by the degree of pressure in distribution manifold 5), as an incident to an increase in the rate of demand for the combustible gaseous mixture, is illustrated in Fig. 1, and comprises a known form of cam member 69 having an operative low point 69$^a$ and an operative high point 69$^b$ with a cam surface 69$^c$ therebetween; said surface 69$^c$ being spaced radially outwardly from shaft 49 at a uniformly increasing rate from point 69$^a$ to point 69$^b$. In practice the low and high points are angularly spaced only slightly less than 180 degrees from each other. Member 69 is keyed or otherwise non-rotatably attached to shaft 49 at such a rotary angle that when all of the units of the plant are inactive a portion of the cam surface 69$^c$ adjacent the high point 69$^b$ thereof will underlie a roller or similar member 70$^a$ rotatably supported by pin 70$^b$ upon a lever 70 pivotally supported at 70$^c$ upon a suitable fixed member 70$^d$. A flexible wire or cord 71 has one end thereof attached to lever 70 adjacent the free end of the latter; the other end of cord 71 being attached to the hooked upper end of a coiled tension spring 72, whose lower end is attached to the aforementioned lever 66 carrying cup 65. Thus with the various elements of the system in their respective initial positions the degree of tension of spring 72 will be at a maximum, thereby reducing to its minimum normal value the degree of loading of regulator 24. As shaft 49 rotates step-by-step in a clockwise direction cam surface 69 will act to gradually decrease the tension of spring 72.

The condition wherein all of the gas mixing units 8 to 11, inclusive, are inactive may occur when the system is employed for "peak shaving," or as a means for maintaining a desired distribution pressure where another or main supply of combustible gas may be insufficient in quantity to satisfy the maximum possible demand. However, when a system like that disclosed in Fig. 1 is employed as the sole supply of combustible gas to a distribution system, normally either the smaller gas mixing unit 11 or any one or more of the units 8 to 11, inclusive, will be in operation at any given time, depending upon the instantaneous rate of demand as reflected by variations in the distribution pressure after each automatic setting, or resetting, of the parts of the system.

If it be assumed that all of the gas mixing units 8 to 11, inclusive, are inactive (as an incident to lack of demand for gas in the distribution system) the latch gear 46 will have been rotated in a counterclockwise direction to one of its extreme positions; the shaft 49 and cam members 53 and 54 being moved simultaneously therewith. Upon a drop in the distribution pressure the parts aforedescribed will act to initiate operation of the smallest gas mixing unit 11, thus supplying to manifold 5 a combustible gas at a volumetric rate corresponding to one-fifteenth of the maximum capacity of the entire system (step 1). If the demand is not satisfied unit 10 will be rendered active, and operation of unit 11 discontinued, thus doubling the volume of gas supplied to the distribution system (step 2). Always assuming that the demand is not satisfied, the units will further be operated as follows: Unit 10 will be continued in operation and unit 11 will be actuated (step 3); unit 9 will then be actuated, and operation of units 10 and 11 discontinued (step 4); unit 9 will be continued in operation and unit 11 will be actuated (step 5); unit 9 will be continued in operation, actuation of unit 10 will be effected, and operation of unit 11 discontinued (step 6); units 9 and 10 will be continued in operation and unit 11 will be actuated (step 7); unit 8 will then be actuated, and operation of units 9, 10 and 11 discontinued (step 8); unit 8 will be continued in operation and unit 11 will be actuated (step 9); unit 8 will be continued in operation, unit 10 will be actuated, and operation of unit 11 discontinued (step 10); units 8 and 10 will be continued in operation, and actuation of unit 11 will be effected (step 11); unit 8 will be continued in operation, actuation of unit 9 will be effected, and operation of units 10 and 11 discontinued (step 12); units 8 and 9 will be continued in operation, and actuation of unit 11 effected (step 13); units 8 and 9 will be continued in operation, actuation of unit 10 effected, and operation of unit 11 discontinued (step 14, which is the condition of the system illustrated in Fig. 1); and upon a further demand for gas units 8, 9 and 10 will be continued in operation, and actuation of unit 11 effected (step 15).

Cam members 53 and 54 are cooperatively shaped and arranged with respect to each other and to the pairs of valves 28, 30 and 29, 31 as to provide the aforedescribed sequence of operation of units 8 to 11, inclusive, as an incident to the afore-described step-by-step rotation of shaft 49 in a clockwise direction from one extreme position to the other. More particularly, valves 28, 29, 30 and 31 have rollers 28$^b$, 29$^b$, 30$^b$ and 31$^b$ respectively associated therewith for actuation by the various cam formations. Thus, with all of the units 8 to 11 inactive, the points 53$^a$ and 53$^b$ of the high portions of cam member 53 will respectively engage rollers 28$^b$ and 30$^b$ to effect closure of valves 17 and 15; and the points 54$^a$ and 54$^b$ of cam member 54 will respectively engage rollers 29$^b$ and 31$^b$ to effect closure of valves 16 and 14. Upon the first step of clockwise movement of shaft 49 (with corresponding movement of cam members 53 and 54) the cam depression or valley 53$^c$ will be alined with roller 28$^b$, to permit downward movement of piston 28$^c$ to an extent sufficient to afford communication between conduits 27 and 28ª, thus effecting full opening movement of valve 17, to initiate operation of gas mixing unit 11. Under the conditions just mentioned the other pistons 29ᶜ, 30ᶜ and 31ᶜ will be retained in their inner extreme positions, whereby closure of the other valves 14, 15 and 16 is insured.

Upon the next step of clockwise movement of shaft 49 roller 28ᵇ will ride up onto the raised or hill portion 53ᵈ of cam 53, thus effecting movement of piston 28ᶜ to its inner extreme position (like the position thereof shown in Fig. 1) to interrupt communication between conduits 27 and 28ª, and to vent the latter to atmosphere, thus providing for reclosure of valve 17 under its normal spring bias to discontinue operation of unit 11. At the same time the cam surface 54ª will have moved out of alinement with roller 29ᵇ, and the latter will be freed to move into the next adjacent portion of the depression or valley 54ᶜ formed in the periphery of cam member 54, thus permitting outward movement of piston 29ᶜ to afford communication between conduits 27 and 29ª, thereby effecting full open positioning of valve 16, against its normal spring bias, to initiate operation of gas mixing unit 10. Under the conditions just mentioned the rollers 30ᵇ and 31ᵇ will be engaged by the raised portions 53ᵇ and 54ᵇ of cams 53 and 54. With unit 10 only in operation the distribution manifold 5 will be supplied with a volume of the desired combustible gaseous mixture corresponding to two-fifteenths of the maximum capacity of the system. In the next step of increase in the rate of gas making the units 10 and 11 will be operated jointly, to provide three-fifteenths of the total plant capacity; and in the next step of increase, operation of unit 9 will be effected and operation of units 10 and 11 will be discontinued; and so on.

If the demand for the gaseous mixture is or becomes of sufficient magnitude to require operation of all of the units 8 to 11, inclusive, jointly, the units will be operated automatically in the step-by-step manner aforedescribed; the calorimetric device having supervision of the proportionality of the constituents of the gaseous mixture supplied by each unit under all conditions, to insure maintenance of a constant desired total heating value per unit volume of the combustible mixture.

With reference to Fig. 1, it will be noted that the various elements of the system are in the respective positions thereof which provide for operation of the system at fourteen-fifteenths of its maximum capacity, units 8, 9 and 10 being in operation and unit 11 being inactive. Upon a predetermined degree of reduction of the pressure within distribution manifold 5, as an incident to a demand for the mixture greater than that being supplied by the active units, the elements of the system will respond automatically to effect another step of rotation of shaft 49 in a clockwise direction, whereupon the depression or valley 53ᵉ in cam member 53 will be alined with roller 28ᵇ. As a result piston 28ᶜ will be free to move outwardly to afford communication between conduits 27 and 28ª, with consequent operation of unit 11, as aforedescribed; the other units 8, 9 and 10 continuing in operation. The system will then be operating at its maximum capacity.

Operation of the system under given conditions will now be described, by way of example, with reference to the graphic illustration in Fig. 2, wherein the full line graph A represents variations in the distribution or delivery pressure in inches of water, and the dotted line graph B represents variations in the control point of regulator 24. Dotted line graph C represents variations in the value of the demand for gas in units of make, and full line graph D represents variations in the volumetric rate of delivery of gas in corresponding units. All of the graphs are plotted as a function of time and are representative of a system in which the capacity of the distribution system in cubic feet is approximately equal to one-half the hourly maximum rate (step #15) of make.

During the time interval from 0 to 8 in the graph of Fig. 2 the demand equals or slightly exceeds the rate of make, and consequently the distribution pressure falls an infinitesimal amount, which, with the aforedescribed floating-action control, moves the step-by-step mechanism in a direction to go from rate #6 to rate #7. At the time when step #7 in operation of the system occurs, the rate of make increases, said control point is lowered (due to the fact that the temporary lowering of the control point is of greater value than that of the permanent rise of the control point incident to the change in the position of the step by step mechanism 34 during the change from rate #6 to rate #7).

During the time interval from 8 minutes to 8.4 minutes the temporary lowering of the control point decreases and the distribution pressure rises, due to the rate of make being almost 6⅔ per cent of full load make above the demand. Inasmuch as the control point is below the distribution pressure the regulator starts moving in the direction to go from step #7 to step #6 and at the end of the interval from 8 to 8.4 minutes does so, thus raising the control point and reducing the rate of make to slightly less than the rate of demand.

During the time interval from 8.4 minutes to 14 minutes the distribution pressure slowly falls. The control point at first exceeds the distribution pressure and the step by step mechanism starts to move to increase the rate of make, but at about 9 minutes time the movement stops and reverses; then at 11.5 minutes again stops and reverses to move toward step #7, which occurs at 14 minutes. This cycle repeats itself until some change in demand occurs. For example, graph C indicates that at 22 minutes time the demand suddenly increased to a value midway between steps #6 and #7 of make. Operation of the system will then be similar to the operation between time 8.4 minutes and 14 minutes; except that since the change in distribution pressure is more rapid between steps #6 and #7 the cycles are shorter and more symmetrical between steps #6 and #7.

Between the 34 minutes and 40 minutes points of time it is assumed that the demand for gas decreased gradually from the equivalent of 6½ (between steps #6 and #7) to 3½ (between steps #3 and #4) and that operation previous to the 34 minutes point in time resulted in a step-up in make from step #6 to step #7 at time 34. Immediately following the step at time 34 the control point was lowered below the distribution pressure, thus tending to return the system to step #6. Thereupon the pressure starts to rise at an increasing rate, the control point approximating the pressure at about 34.6, but falling below that value thereafter. At about 35.4 time the change to step #6 occurs, raising the control point and decreasing the flow to substantially equal the demand. At time 36.6 the change to step #5 occurs, and at time 38 the change to step #4 occurs, etc. It will be noted that for each step down the permanent lowering of the control point is one inch of water, so that on step #3 the control point, after the temporary offset is reduced to zero, is 27; whereas on steps #7, #6, #5 and #4 it was 31, 30, 29 and 28, respectively. With the demand midway between step #6 and step #7 the average maintained pressure would be 30.5 inches; whereas at the lower rate of demand between step #3 and step #4 the average maintained pressure would be 27.5 inches. On step #15 the maintained pressure will therefore be 39 inches, and on #0 step such maintained pressure would be 24 inches.

It is apparent that in order to get the character of control aforedescribed there must be a predetermined relationship between the value of the temporarily offset control point and the respective permanent control point, and that the former must not exceed the latter, and must be opposite in direction with respect thereto. It is likewise apparent that the rate of dissipation of the temporarily offset value of the control point must be adjustable in order to match the capacity of the distribution system in order to prevent excessive stepping of the step by step mechanism and objectionable hunting.

The advantages of the permanent offset in maintained pressure associated with the rate of make will be apparent to those familiar with gas distribution.

As shown in Fig. 1, during closure of valve 17 the check valve 11$^b$ returns by gravity to its closed position, thus preventing possibility of any escape of the gaseous mixture from distribution manifold 5 through conduit 11$^c$ to the air manifold or conduit 7. As aforeindicated, the other units 8, 9 and 10 of the system are in operation, and hence the check valves 8$^b$, 9$^b$ and 10$^b$ are automatically opened in response to the degree of suction or partial vacuum created by the action of the jets of propane vapor from nozzles 8$^a$, 9$^a$ and 10$^a$ within the throats 8$^e$, 9$^e$ and 10$^e$ of the associated Venturi tubes; the throat of the Venturi tube forming a part of unit 11 being shown at 11$^e$. Also as aforestated each of the diaphragm-operated valves 14 to 17, inclusive, is moved automatically to its fully closed position upon release of the fluid pressure upon its diaphragm so as to provide for inoperation of its respective unit 8 to 11, inclusive, when required.

In the modified form of multiple-unit gas mixing plant, of which a fragment is shown diagrammatically in Fig. 3, those parts which may be identical with corresponding parts illustrated in Fig. 1 are given like numerals of reference; it being understood that the fragments of conduits 25, 28$^a$, 29$^a$, 30$^a$, 31$^a$ and 39 are connected to the other elements of the complete system in exactly the same manner as illustrated in Fig. 1.

In Fig. 3, however, the gas mixing units 73, 74, 75 and 76, respectively, comprise gas motors 73$^a$, 74$^a$, 75$^a$ and 76$^a$ adapted to be driven selectively by the branch streams of propane vapor, when flowing through branch conduits 77, 78, 79 and 80, under control of the valves 14 through 17, respectively. Motors 73$^a$ to 76$^a$, inclusive, each have a positive driving connection with the air pumps 73$^b$, 74$^b$, 75$^b$ and 76$^b$, respectively, to provide for operation of the elements of each gas mixing unit in unison. In practice the gas motors 73$^a$ to 76$^a$ have capacities related to each other in the manner of a geometric progression; and the same is true of the air pumps 73$^b$ to 76$^b$, inclusive; said air pumps 73$^b$, etc., being shown as of substantially larger capacity than the respective gas motors 73$^a$, etc., to afford the desired normal proportionality of propane vapor and air to be supplied by each unit when active. Units 73 to 76, inclusive, are selectively rendered active, either individually or jointly, through control of the valves 14 to 17, respectively associated therewith, in the same manner as described in connection with the system of Fig. 1.

As aforedescribed, the valves 14 to 17, inclusive, are normally biased to fully closed position, and are selectively moved to fully opened position upon supply of compressed air, or the like, thereto through the respective conduits 31$^a$, 30$^a$, 29$^a$, and 28$^a$, under control of the means described in connection with Fig. 1. The branch conduits 81 to 84, inclusive, leading from the air manifold 7 are adapted to withdraw air from the latter under the degree of suction or partial vacuum created by operation of the respective pumps 73$^b$ to 76$^b$. Each branch conduit includes a check valve, to insure against leakage of any propane vapor, or of the gaseous mixture from distribution manifold 5, through such conduit during inaction of the air pump respectively associated therewith.

The pilot regulator 26 in Fig. 3 functions in the same manner as described in connection with Fig. 1 to automatically control the proportioning of the rate of flow of air through manifold 7 to normally maintain constant the value of the difference between the pressure of the gaseous mixture in manifold 5 and the partial vacuum in conduit 7, as modified by the aforedescribed adjustment of regulator 26 through the medium of motor 37, in response to variations in the total heating value per unit volume of the gaseous mixture.

From the foregoing, it will be apparent to those skilled in the art that the gas mixing plant of Fig. 3 is adapted to function in the same manner as that disclosed in Fig. 1 to provide 15 different rates of gas mixing, to satisfy the various different rates of demand.

The modified form of gas mixing plant, of which a fragment is illustrated diagrammatically in Fig. 4 is functionally like those shown in Figs. 1 and 3; the manner in which the illustrated elements of Fig. 4 would be substituted for the corresponding elements of Fig. 1 being indicated by the fragments of the conduit 25, 31$^a$, 30$^a$, 29$^a$ and 28$^a$. Thus, the propane vapor is supplied under control of pressure regulator 12, to conduit 6 at a predetermined constant pressure, which is usually substantially less than its normal or inherent pressure. Conduit 6 communicates with the vapor manifold 13, which in turn communicates with the respective branch conduits 85 to 88, inclusive. The air manifold 7 communicates with branch conduits 89 to 92, inclusive. Each branch conduit 85 to 88, inclusive, is provided with a check valve, as shown, and a restriction or orifice 85$^a$, 86$^a$, 87$^a$, and 88$^a$, respectively. Each branch conduit 89 to 92, inclusive, is provided with a check valve, as shown, and a hand-set valve 89$^a$, 90$^a$, 91$^a$ and 92$^a$, respectively. Said last mentioned group of check valves perform the functions of the check valves 8$^b$, 9$^b$, 10$^b$ and 11$^b$ of Fig. 1; and the hand-set valves 89$^a$ to 92$^a$, inclusive, are functionally like the hand-set valves 8$^d$ to 11$^d$, respectively, of Fig. 1.

As shown, the branch conduits 85 to 88 inclusive, communicate with branch conduits 89 to 92, respectively; whereby the right-hand portion of conduits 89 to 92 are respectively adapted to accommodate the combined or mixed flow of propane vapor and air. The proper proportionality of the branch flows of propane vapor and air is effected, in part, by the provision of the positive displacement type fluid pumps 93, 94, 95, and 96, which act to mix and pump the propane vapor and air, at the desired or required pressure, into the distribution manifold 5, for conduction to the distribution system. The respective pumps 93 to 96 (which differ in capacity relatively to each other in the same manner and for the same purpose as the units 8 to 11, inclusive, in Fig. 1) are preferably driven at like speeds by electric motors 97 to 100, inclusive. Although, as shown, the motors 97 to 100, inclusive, are of respectively different sizes corresponding to the difference in sizes of the pumps 93 to 96, said motors may, of course, be of like size, provided that the same are of sufficiently large size to effect operation of the largest pump (93) at the desired speed. Motors 97 to 100, inclusive, are subject to control to effect interruption or completion of the respective circuit thereof selectively through relays $97^a$ to $100^a$, respectively; the latter in turn being subject to control by the normally open sets of contacts $97^b$ to $100^b$, respectively. Said sets of contacts are operable selectively by diaphragm motors $97^c$ to $100^c$, respectively; said diaphragm motors being respectively connected by conduits $31^a$, $30^a$, $29^a$ and $28^a$ to render the pumps 93 to 96 active either individually or jointly in a selective manner, through the medium of control means shown and described in connection with Fig. 1.

Although the regulator 26 has the conduit 25 leading thereto and the conduit $19^b$ leading therefrom in the same manner as illustrated in Figs. 1 and 3; it will be noted that the lower chamber of regulator 26 is in communication with conduit 7 through the medium of conduit 101, whereas, the upper chamber of regulator 26 is in communication with conduit 13 through the medium of conduit 102. Thus, in Fig. 4 the position of valve 18 in conduit 7 is normally controlled by diaphragm motor 19, which is under the control of regulator 26; whereas the degree of operation of diaphragm motor 19 is responsive to the differential value of the degree of partial vacuum in conduit 7 (in the lower chamber of regulator 26) and the degree of pressure of the chamber in the manifold 13 (in the upper chamber of regulator 26).

The arrangement of elements illustrated in Fig. 4 is particularly desirable in installations where neither the propane vapor (or a similar volatile hydrocarbon vapor) nor the air, or similar gas to be mixed with the vapor, is available at a pressure sufficient to effect pumping of the other constituent gas at the desired pressure.

As an obvious modification of the system shown in Fig. 4, it would be possible to employ four pumps of the same size, say, like that shown at 96, and four electric motors of the same size, say, like that shown at 100, instead of the pumps 93 to 96 shown and the motors 97 to 100 shown; provided that suitable means were provided for operating the four motors of like size at predetermined constant speeds which differ in the manner of a geometric progression. For example, the motor 100 driving the pump associated with conduit 92 when active would operate at a given speed, the second motor would operate at twice the speed of the first, and so on, to provide for attainment of the results herein contemplated.

As will be apparent from the foregoing description, in the event of an increase in the pressure of the gas in distribution conduit 5 above the value preset by the setting of the control point of regulator 24, the diaphragm $24^e$ tends to move upward, thus restricting the degree of opening of valve $24^c$. As a consequence, the rate of supply of air to conduit 38 decreases, and causes a decrease in the degree of pressure in chamber $33^b$; it being noted that due to the continuous venting of the air through orifice $38^a$ a negative net flow of air into the system (conduit 38 and chamber $33^b$) results, thus reducing the pressure in said system. As a result the spring $33^f$ is permitted to function to move the diaphragm $33^a$ and connecting rod 41 upwardly toward the normal positions thereof, causing gear segment 42 to move in a clockwise direction, with consequent movement of its associated parts (including gear 46) in a counterclockwise direction. This effects movement of the selector parts (including cams 53 and 54) in a direction to change the operation of the gas mixing units in a manner to decrease the rate of gas mixing.

I claim:

1. The method of supplying a combustible mixture of gases to a distribution system at a volumetric rate substantially corresponding to the rate of demand for such mixture, which consists in increasing or decreasing the volumetric rate of supply of said mixture in equal volumetric steps in accordance with changes in the rate of demand for such mixture to afford a volumetric rate of supply of said mixture differing from the rate of demand by less than a volumetric step, and additionally controlling the rates of supply of said mixture so that the average distribution pressure of said mixture maintained between any given rate of supply and the next higher rate of supply will be greater than between said any given rate of supply and the next lower rate of supply.

2. The method of supplying a combustible mixture of gases to a distribution system at a volumetric rate substantially corresponding to the rate of demand for such mixture, which consists in increasing or decreasing the volumetric rate of supply of said mixture in equal volumetric steps in accordance with changes in the rate of demand for such mixture to afford a volumetric rate of supply of said mixture differing from the rate of demand by less than a volumetric step, additionally controlling the rates of supply of said mixture so that the average distribution pressure of said mixture maintained between any given rate of supply and the next higher rate of supply will be greater than between said any given rate of supply and the next lower rate of supply, and continuously controlling the volumetric proportionality of the constituents of said mixture in accordance with variations in the instantaneous total heating value per unit volume of the latter to thereby maintain the total heating value per unit volume of the mixture substantially constant.

3. In a multiple-rate gas mixing plant, in combination, a multiplicity of gas mixing units of different sizes respectively, the sizes of said units being related to each other in the manner of a geometric progression with a ratio of two, whereby the same may be operated either individually or jointly to provide a multiplicity of equal increments or decrements in the rate of gas mixing throughout the total range or capacity of the plant, a distribution manifold into which each of said units when active is adapted to discharge, a source of supply of combustible gas to be supplied to each unit when active at a pressure a predetermined degree above atmospheric pressure, an atmospheric air manifold common to all of said units when active, each unit having a check valve interposed between the same and said air manifold, a source of supply of compressed air, a pair of pilot regulators, one of said pilot regulators being subject to control in accordance with variations in the pressure of the combustible gaseous mixture in said distribution manifold, the other pilot regulator being subject to control in accordance with the differential value of the pressure conditions within said distribution manifold and said air manifold respectively, a diaphragm motor subject to control by the rate of supply of compressed air from said pilot regulator first mentioned, diaphragm motors individual to each gas mixing unit for controlling initiation and discontinuance of operation of each of the latter, means operated by said first mentioned diaphragm motor for effecting control of the supply of compressed air to said diaphragm motors second mentioned to effect initiation or discontinuance of operation of the respective units in a predetermined sequence in response to variations of pressure in the distribution manifold as an incident to variation in the rate of demand for the combustible gaseous mixture, a valve in said air manifold, and a diaphragm motor subject to control by said second pilot regulator to effect operation of said valve to normally maintain substantially constant the differential value of said pressure conditions within said air manifold and said distribution manifold.

4. In a multiple-rate gas mixing plant, in combination, a multiplicity of gas mixing units of different sizes respectively, the sizes of said units being related to each other in the manner of a geometric progression with a ratio of two, whereby the same may be operated either individually or jointly to provide a multiplicity of equal increments or decrements in the rate of gas mixing throughout the total range or capacity of the plant, a distribution manifold into which each of said units when active is adapted to discharge, a source of supply of combustible gas to be supplied to each unit when active at a pressure a predetermined degree above atmospheric pressure, an atmospheric air manifold common to all of said units when active, each unit having a check valve interposed between the same and said air manifold, a source of supply of compressed air, a pair of pilot regulators, one of said pilot regulators being subject to control in accordance with variations in the pressure of the combustible gaseous mixture in said distribution manifold, the other pilot regulator being subject to control in accordance with the differential value of the pressure conditions within said distribution manifold and said air manifold respectively, a diaphragm motor subject to control by the rate of supply of compressed air from said pilot regulator first mentioned, diaphragm motors individual to each gas mixing unit for controlling initiation and discontinuance of operation of each of the latter, means operated by said first mentioned diaphragm motor for effecting control of the supply of compressed air to said diaphragm motors second mentioned to effect initiation or discontinuance of operation of the respective units in a predetermined sequence in response to variations of pressure in the distribution manifold as an incident to variation in the rate of demand for the combustible gaseous mixture, a valve in said air manifold, a diaphragm motor subject to control by said second pilot regulator to effect operation of said valve to normally maintain substantially constant the differential value of said pressure conditions within said air manifold and said distribution manifold, a calorimetric device for continuously ascertaining the instantaneous total heating value per unit volume of said gaseous mixture, and means including an electric motor subject to control by said calorimetric device for effecting adjustment of said second mentioned pilot regulator, with consequent adjustment of said diaphragm operated valve in the air manifold, to thereby maintain substantially constant the total heating value per unit volume of said gaseous mixture under all conditions.

5. In a multiple-rate gas mixing plant, in combination a multiplicity of gas mixing units of different sizes respectively, the sizes of said units being related to each other in the manner of a geometric progression with a ratio of two, whereby the same may be operated either individually or jointly to provide a multiplicity of equal increments or decrements in the rate of gas mixing throughout the total range or capacity of the plant, a distribution manifold into which each of said units when active is adapted to discharge, a source of supply of combustible gas to be supplied to each unit when active at a pressure a predetermined degree above atmospheric pressure, an atmospheric air manifold common to all of said units when active, each unit having a check valve interposed between the same and said air manifold, a source of supply of compressed air, a pair of pilot regulators, one of said pilot regulators being subject to control in accordance with variations in the pressure of the combustible gaseous mixture in said distribution manifold, the other pilot regulator being subject to control in accordance with the differential value of the pressure conditions within said distribution manifold and said air manifold respectively, a diaphragm motor subject to control by the rate of supply of compressed air from said pilot regulator first mentioned, diaphragm motors individual to each gas mixing unit for controlling initiation and discontinuance of operation of each of the latter, means operated by said first mentioned diaphragm motor for effecting control of the supply of compressed air to said diaphragm motors second mentioned to effect initiation or discontinuance of operation of the respective units in a predetermined sequence in response to variations of pressure in the distribution manifold as an incident to variation in the rate of demand for the combustible gaseous mixture, said last mentioned means including means to temporarily effect a decrease or an increase in the degree of loading of the first mentioned pilot regulator as an incident to an increase or decrease, respectively, in the rate of demand for the mixture, a valve in said air manifold, and a diaphragm motor subject to control by said second pilot regulator to effect operation of said valve to normally maintain substantially constant the differential value of said pressure conditions within said air manifold and said distribution manifold.

6. In a multiple-rate gas mixing plant, in combination, a multiplicity of gas mixing units of different sizes respectively, the sizes of said units being related to each other in the manner of a geometric progression with a ratio of two, whereby the same may be operated either individually or jointly to provide a multiplicity of equal increments or decrements in the rate of gas mixing throughout the total range or capacity of the plant, a distribution manifold into which each of said units when active is adapted to discharge, a source of supply of combustible gas to be supplied to each unit when active at a pressure a predetermined degree above atmospheric pressure, an atmospheric air manifold common to all of said units when active, each unit having a check valve interposed between the same and said air manifold, a source of supply of compressed air, a pair of pilot regulators one of said pilot regulators being subject to control in accordance with variations in the pressure of the combustible gaseous mixture in said distribution manifold, the other pilot regulator being subject to control in accordance with the differential value of the pressure conditions within said distribution manifold and said air manifold respectively, a diaphragm motor subject to control by the rate of supply of compressed air from said pilot regulator first mentioned, diaphragm motors individual to each gas mixing unit for controlling initiation and discontinuance of operation of each of the latter, means operated by said first mentioned diaphragm motor for effecting control of the supply of compressed air to said diaphragm motors second mentioned to effect initiation or discontinuance of operation of the respective units in a predetermined sequence in response to variations of pressure in the distribution manifold as an incident to variation in the rate of demand for the combustible gaseous mixture, said last mentioned means controlling means associated with said first pilot regulator to temporarily effect a decrease or an increase in the degree of loading bias of the latter as an incident to an increase or decrease, respectively, in the rate of demand for the mixture, cam-operated tensioning means also operated by said first pilot regulator to continuously effect a gradual increase or decrease in the degree of loading bias of said first pilot regulator as an incident to an increase or decrease, respectively, in said rate of demand, whereby the operation of the system is stabilized, a valve in said air manifold, and a diaphragm motor subject to control by said second pilot regulator to effect operation of said valve to normally maintain substantially constant the differential value of said pressure conditions within said air manifold and said distribution manifold.

7. In a multiple-rate gas mixing plant, in combination, a multiplicity of gas mixing units of different sizes respectively, the sizes of said units being related to each other in the manner of a geometric progression with a ratio of two, whereby the same may be operated either individually or jointly to provide a multiplicity of equal increments or decrements in the rate of gas mixing throughout the total range or capacity of the plant, a distribution manifold into which each of said units when active is adapted to discharge, a source of supply of combustible gas to be supplied to each unit when active at a pressure a predetermined degree above atmospheric pressure, an atmospheric air manifold common to all of said units when active, each unit having a check valve interposed between the same and said air manifold, a source of supply of compressed air, a pair of pilot regulators one of said pilot regulators being subject to control in accordance with variations in the pressure of the combustible gaseous mixture in said distribution manifold, the other pilot regulator being subject to control in accordance with the differential value of the pressure conditions within said distribution manifold and said air manifold respectively, a diaphragm motor subject to control by the rate of supply of compressed air from said pilot regulator first mentioned, diaphragm motors individual to each gas mixing unit for controlling initiation and discontinuance of operation of each of the latter, means operated by said first mentioned diaphragm motor for effecting control of the supply of compressed air to said diaphragm motors second mentioned to effect initiation or discontinuance of operation of the respective units in a predetermined sequence in response to variations of pressure in the distribution manifold as an incident to variation in the rate of demand for the combustible gaseous mixture, said last mentioned means controlling means associated with said first pilot regulator to temporarily effect a decrease or an increase in the degree of loading of the latter as an incident to an increase or decrease, respectively, in the rate of demand for the mixture, a valve in said air manifold, a diaphragm motor subject to control by said second pilot regulator to effect operation of said valve to normally maintain substantially constant the differential value of said pressure conditions within said air manifold and said distribution manifold, a calorimetric device for continuously ascertaining the instantaneous total heating value per unit volume of said gaseous mixture, and means including an electric motor subject to control by said calorimetric device for effecting adjustment of said second mentioned pilot regulator, with consequent adjustment of said diaphragm operated valve in the air manifold, to thereby maintain substantially constant the total heating value per unit volume of said gaseous mixture under all conditions.

8. In a multiple-rate gas mixing plant, in combination, a multiplicity of gas mixing units of different sizes respectively, the sizes of said units being related to each other in the manner of a geometric progression with a ratio of two, whereby the same may be operated either individually or jointly to provide a multiplicity of equal increments or decrements in the rate of gas mixing throughout the total range of capacity of the plant, a distribution manifold into which each of said units when active is adapted to discharge, a source of supply of combustible gas to be supplied to each unit when active at a pressure a predetermined degree above atmospheric pressure, an atmospheric air manifold common to all of said units when active, each unit having a check valve interposed between the same and said air manifold, a source of supply of compressed air, a pair of pilot regulators one of said pilot regulators being subject to control in accordance with variations in the pressure of the combustible gaseous mixture in said distribution manifold, the other pilot regulator being subject to control in accordance with the differential value of the pressure conditions within said distribution manifold and said air manifold respectively, a diaphragm motor subject to control by the rate of supply of compressed air from said pilot regulator first mentioned, diaphragm motors individual to each gas mixing unit for controlling initiation and discontinuance of operation of each of the latter, means operated by said first mentioned diaphragm motor for effecting control of the supply of compressed air to said diaphragm motors second mentioned to effect initiation or discontinuance of operation of the respective units in a predetermined sequence in response to variations of pressure in the distribution manifold as an incident to variation in the rate of demand for the combustible gaseous mixture, said last mentioned means controlling means associated with said first pilot regulator to temporarily effect a decrease or an increase in the degree of loading bias of the latter as an incident to an increase or decrease, respectively, in the rate of demand for the mixture, cam-operated tensioning means also operated by said first pilot regulator to continuously effect a gradual increase or decrease in the degree of loading bias of said first pilot regulator as an incident to an increase or decrease, respectively, in said rate of demand, whereby the operation of the system is stabilized, a valve in said air manifold, a diaphragm motor subject to control by said second pilot regulator to effect operation of said valve to normally maintain substantially constant the differential value of said pressure conditions within said air manifold and said distribution manifold, a calorimetric device for continuously ascertaining the instantaneous total heating value per unit volume of said gaseous mixture, and means including an electric motor subject to control by said calorimetric device for effecting adjustment of said second mentioned pilot regulator, with consequent adjustment of said diaphragm operated valve in the air manifold, to thereby maintain substantially constant the total heating value per unit volume of said gaseous mixture under all conditions.

9. In a multiple rate gas mixing plant, in combination, a multiplicity of gas mixing units of different sizes respectively, the sizes of said units being related to each other in the manner of a geometric progression with a ratio of two, whereby the same may be operated either individually or jointly to provide a multiplicity of gas mixing rates in arithmetic progression equal in number to two raised to the power of the number of gas mixing units minus one, a distribution system into which each of said units when active is adapted to discharge, a flow rate setting mechanism having a multiplicity of definite operating positions exceeding by one the number of gas mixing rates afforded by said mixing units and being operable to its various operating positions in a step by step manner, floating action control means responsive to variations in distribution pressure for effecting positioning of said rate setting mechanism in accordance with the rate of demand for gas, and means for effecting operation selectively of any or all of the gas mixing units as a function of said rate setting mechanism.

10. Apparatus for producing and regulating the rate of production and distribution pressure of a combustible mixture of gaseous fluids, comprising, a multiplicity of gas mixing units of different sizes respectively, the sizes of said units being related to each other in the manner of a geometric progression with a ratio of two, whereby the same may be operated either individually or jointly to provide a multiplicity of gas mixing rates in arithmetic progression equal in number to two raised to the power of the number of gas mixing units, minus one, a distribution system into which each of said units when active is adapted to discharge, a flow rate setting mechanism having a multiplicity of definite operating positions exceeding by one the number of different gas mixing rates afforded by said gas mixing units and being operable to its various operating positions in a step by step manner, floating action control means responsive to variations in distribution pressure for effecting positioning of said rate setting mechanism in accordance with the rate of demand for gas, means for effecting operation selectively of said gas mixing units according to the position of said rate setting mechanism, and control point resetting means responsive to change in position of said rate setting mechanism to afford reset of the control point of said floating action control means a predetermined amount in a direction corresponding to the direction of change in position of said rate setting mechanism.

11. Apparatus for producing and regulating the rate of production and distribution pressure of a combustible mixture of gaseous fluids, comprising, a multiplicity of gas mixing units of different sizes respectively, the sizes of said units being related to each other in the manner of a geometric progression with a ratio of two, whereby the same may be operated individually or jointly to provide a multiplicity of gas mixing rates in arithmetic progression equal in number to two raised to the power of the number of gas mixing units, minus one, a distribution system into which each of said units when active is adapted to discharge, a flow rate setting mechanism having a multiplicity of definite operating positions exceeding by one the number of different flow rates afforded by said gas mixing units and being operable to its various operating positions in a step by step manner, floating action control means responsive to variations in distribution pressure for effecting positioning of said rate setting mechanism in accordance with the rate of demand for gas, means for effecting operation selectively of said gas mixing units as a function of position of said rate setting mechanism, control point resetting means responsive to change in position of said rate setting mechanism to afford reset of the control point of said floating action control means a predetermined amount in a direction corresponding to the direction of change of position of said rate setting mechanism, second control point resetting means responsive to change in position of said rate setting mechanism to temporarily reset the control point of said floating action control means in a direction opposite to the direction of change in position of said rate setting mechanism an amount offsetting and exceeding the effect of the reset afforded by the first mentioned control point resetting means, and means acting as a result of the resetting action of said second control point resetting means to gradually reduce to zero the magnitude of the temporary reset afforded by the latter means to thereafter render the reset afforded by said first mentioned control point resetting means effective.

12. Apparatus for producing and regulating the rate of production, distribution pressure and heating value of a combustible mixture of gaseous fluids, comprising, at least four similar gas mixing units, the first unit having a preselected capacity, the second unit having twice the capacity of the first unit, the third unit having four times the capacity of the first unit, and the fourth unit having eight times the capacity of the first unit, a distribution system into which each of said units is adapted to discharge, a flow rate setting mechanism having a multiplicity of definite operating positions exceeding by one the number of different flow rates afforded by said gas mixing units and being operable in reverse directions to its various operating positions in a step by step manner, floating action control means responsive to given variations in the distribution pressure for effecting positioning of said flow rate setting mechanism in accordance with the rate of demand for gas, means for effecting operation selectively of said gas mixing units as a function of position of said rate setting mechanism, control point resetting means responsive to change in position of said step by step mechanism to afford reset of the control point of said floating action control means a predetermined amount in a direction corresponding to the direction of change in position of said step by step mechanism, second control point resetting means responsive to change in position of said step by step mechanism to temporarily reset the control point of said floating action control in a direction opposite to the direction of change in position of said step by step mechanism an amount offsetting and exceeding the reset afforded by the first mentioned control point resetting mechanism, means acting as a result of the resetting action of said second control point resetting means to gradually reduce to zero the magnitude of the temporary reset afforded by the latter means to render the reset afforded by said first mentioned control point resetting means effective, calorimetric means continuously acting to ascertain the instantaneous heating value per unit volume of the mixture supplied by the active gas mixing units, and means controlled by said calorimetric means to effect a variation in rate of flow of one of the constituent gaseous fluids to the active unit in accordance with variations in the heating value of the final mixture from a preselected heating value.

EDWIN X. SCHMIDT.

References Cited in the file of this patent

UNITED STATES PATENTS

| Number | Name | Date |
|---|---|---|
| 1,575,260 | Fisher | Mar. 2, 1926 |
| 1,933,641 | Schmidt | Nov. 7, 1933 |
| 2,072,384 | Schmidt | Mar. 2, 1937 |
| 2,148,509 | Shafer | Feb. 28, 1939 |
| 2,415,913 | Schmidt | Feb. 18, 1947 |